United States Patent
Guo et al.

(10) Patent No.: US 9,391,836 B2
(45) Date of Patent: Jul. 12, 2016

(54) METHOD AND TERMINAL FOR LOADING OPERATOR CONFIGURATION INFORMATION

(71) Applicant: Huawei Device Co., LTD, Shenzhen (CN)

(72) Inventors: Ligang Guo, Shenzhen (CN); Minjiang Chen, Shenzhen (CN); Bin Li, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 10 days.

(21) Appl. No.: 14/492,791

(22) Filed: Sep. 22, 2014

(65) Prior Publication Data
US 2015/0011202 A1    Jan. 8, 2015

Related U.S. Application Data

(63) Continuation of application No. PCT/CN2013/072974, filed on Mar. 21, 2013.

(30) Foreign Application Priority Data

Mar. 22, 2012  (CN) .......................... 2012 1 0077953

(51) Int. Cl.
H04L 12/24 (2006.01)
H04W 8/18 (2009.01)
(Continued)

(52) U.S. Cl.
CPC ........ *H04L 41/0803* (2013.01); *H04L 41/0806* (2013.01); *H04L 41/0823* (2013.01);
(Continued)

(58) Field of Classification Search
CPC ....... H04W 8/18; H04W 8/183; H04W 8/186; H04W 8/20; H04W 8/205; H04W 88/06; H04W 48/18; H04W 8/08; H04W 8/02; H04W 8/26; H04W 8/265; H04L 61/6054; H04L 41/0803; H04L 41/0806; H04L 41/0813; H04L 41/0893; H04L 41/08; H04L 41/5041; H04L 41/5045; H04L 41/5048; H04L 41/5051; H04L 41/5054; H04M 1/72563
USPC ...................... 455/432.2, 432.3, 435.1, 435.2
See application file for complete search history.

(56) References Cited

U.S. PATENT DOCUMENTS 8,406,738 B2 *  3/2013  Harada ................. H04M 15/00
                                                        370/338
8,880,040 B2 * 11/2014  Schreiner ............. H04W 8/205
                                                        370/328
(Continued)

FOREIGN PATENT DOCUMENTS

CN      101198115 A      6/2008
CN      101562870 A     10/2009
(Continued)

OTHER PUBLICATIONS

Vodafone, "Proposed New Requirement for the Provision of a MVNO Identifier," TSG-SA WG1 #30, S1-051115, Agenda Item 8, Oct. 24-28, 2005, 2 pages.

(Continued)

*Primary Examiner* — Magdi Elhag
(74) *Attorney, Agent, or Firm* — Slater Matsil, LLP

(57) ABSTRACT

The present invention discloses a method and a terminal for loading operator configuration information. The method includes obtaining network identification information of a terminal. The network identification information includes a mobile country code and a mobile network code. Secondary network identification information of the terminal is obtained when it is determined that the terminal corresponds to at least two groups of operator configuration information according to the network identification information. The secondary network identification information includes a group identifier GID. The operator configuration information corresponding to the terminal is obtained and loaded according to the secondary network identification information.

18 Claims, 3 Drawing Sheets

(51) Int. Cl.
 *H04M 1/725* (2006.01)
 *H04W 8/20* (2009.01)
(52) U.S. Cl.
 CPC ........ *H04L41/0889* (2013.01); *H04L 41/0893* (2013.01); *H04L 41/5054* (2013.01); *H04M 1/72563* (2013.01); *H04W 8/18* (2013.01); *H04W 8/186* (2013.01); *H04W 8/205* (2013.01)

(56) References Cited

U.S. PATENT DOCUMENTS

| | | |
|---|---|---|
| 2006/0030315 A1 | 2/2006 | Smith et al. |
| 2009/0181662 A1 | 7/2009 | Fleischman et al. |
| 2010/0004019 A1 | 1/2010 | Di Caprio et al. |
| 2010/0075669 A1* | 3/2010 | Sparks ............... H04W 8/183 455/433 |
| 2011/0034170 A1 | 2/2011 | Zhong et al. |
| 2011/0176505 A1 | 7/2011 | Hu et al. |
| 2011/0195700 A1 | 8/2011 | Kukuchka et al. |
| 2012/0149373 A1 | 6/2012 | Tian et al. |

FOREIGN PATENT DOCUMENTS

| | | |
|---|---|---|
| CN | 101631340 A | 1/2010 |
| CN | 101657005 A | 2/2010 |
| CN | 101686461 A | 3/2010 |
| CN | 101971656 A | 2/2011 |
| CN | 102075903 A | 5/2011 |
| CN | 102118736 A | 7/2011 |
| CN | 102123350 A | 7/2011 |
| CN | 102318432 A | 1/2012 |
| CN | 102630081 A | 8/2012 |
| EP | 1937015 A1 | 6/2008 |
| FR | 2790161 A1 | 8/2000 |
| JP | 2002537738 | 11/2002 |
| JP | 2009503961 | 1/2009 |

OTHER PUBLICATIONS

"Discussion Paper SIM Cards for Multiple Network Access," TSG-SA WG1 #34, S1-061165, Agenda Item 8, Oct. 23-27, 2006, Paris, France, 4 pages.

* cited by examiner

METHOD AND TERMINAL FOR LOADING OPERATOR CONFIGURATION INFORMATION

This application is a continuation of International Application No. PCT/CN2013/072974, filed on Mar. 21, 2013, which claims priority to Chinese Patent Application No. 201210077953.9, filed on Mar. 22, 2012, both of which are hereby incorporated by reference in their entireties.

TECHNICAL FIELD

The present invention relates to the field of communications technologies and, in particular embodiments, to a method and a terminal for loading operator configuration information.

BACKGROUND

With the rapid development of communications technologies, a new type of mobile network operator—mobile virtual network operator (MVNO) emerges. Different from a conventional mobile network operator (MNO), an MVNO does not own a network but leases a network of an MNO. Therefore, a case where a plurality of operators (a plurality of MVNOs and/or at least one MNO) use a same network occurs. Because different operators have different requirements for parameters such as dialing parameters and network parameters, it is crucial to distinguish operators, automatically load operator configuration information, and ensure that one terminal adapts various types of operators.

In the prior art, different operators are generally distinguished by mobile country codes (MCC) and mobile network codes (MNC), and then corresponding operator configuration information is loaded. When an MVNO exists, there is a case where the MVNO and an MNO use a same network or a plurality of MVNOs share a same network. One network corresponds to one MCC and one MNC. Therefore, a terminal cannot determine an operator according to the MCC and MNC, let alone automatically load correct operator configuration information. Consequently, the prior art can distinguish only different MNOs, but cannot distinguish different MVNOs or distinguish an MVNO from an MNO, failing to adapt one terminal to various types of operators.

SUMMARY

Embodiments of the present invention provide a method and a terminal for loading operator configuration information, so that the terminal can correctly distinguish an operator and automatically load correct operator configuration information.

An embodiment of the present invention provides a method for loading operator configuration information. Network identification information of a terminal is obtained. The network identification information includes a mobile country code MCC and a mobile network code MNC. Secondary network identification information of the terminal is obtained when it is determined, according to the network identification information, that the terminal corresponds to at least two groups of operator configuration information. The secondary network identification information includes a group identifier GID. The operator configuration information corresponding to the terminal according to the secondary network identification information is obtained and loaded.

The step of obtaining network identification information of a terminal specifically includes reading SIM card information of the terminal, and obtaining the network identification information including an MCC and an MNC.

A SIM (subscriber identity module) card is also referred to as a smart card or a subscriber identification card, and a digital mobile phone can be used only after it is equipped with such a card. SIM card uses a computer chip to store content such as information about a digital mobile phone subscriber, an encrypted key, and an address book of a subscriber, and is a smart card that stores identification data of a mobile phone service subscriber.

The step of obtaining secondary network identification information of the terminal specifically includes obtaining a group identifier GID in the SIM card information of the terminal.

Before the step of obtaining secondary network identification information of the terminal, when it is determined, according to the network identification information, that the terminal corresponds to at least two groups of operator configuration information, the method further includes querying a preset configuration library or a configuration file to determine the number of groups of operator configuration information corresponding to the MCC and the MNC.

The method further includes loading the only group of operator configuration information when it is determined that the terminal corresponds to one group of operator configuration information.

The method further includes obtaining and loading default configuration information when it is determined that the terminal corresponds to zero groups of operator configuration information.

Correspondingly, an embodiment of the present invention further provides a terminal, including an obtaining module and a loading module, where the obtaining module is configured to obtain network identification information of a terminal, and obtain secondary network information of the terminal when it is determined, according to the network identification information, that the terminal corresponds to at least two groups of operator configuration information, where the network identification information includes a mobile country code MCC and a mobile network code MNC, and the secondary network identification information includes a group identifier GID, and the loading module is configured, according to the secondary network identification information, to obtain and load operator configuration information corresponding to the terminal.

The obtaining module specifically includes a first obtaining unit, which is configured to read SIM card information of the terminal, and obtain the network identification information including an MCC and an MNC.

The obtaining module specifically further includes: a second obtaining unit, which is configured to obtain a group identifier GID in the SIM card information of the terminal.

The terminal further includes a determining module, which is configured to query a preset configuration library to determine the number of groups of operator configuration information corresponding to the MCC and the MNC.

The loading module is further configured to load the only group of operator configuration information when it is determined that the terminal corresponds to one group of operator configuration information.

The loading module is further configured to obtain and load default configuration information when it is determined that the terminal corresponds to zero groups of operator configuration information.

Implementation of the embodiments of the present invention has the following beneficial effects.

In the embodiments of the present invention, whether a terminal corresponds to an MVNO or an MNO as well as different MVNOs can be distinguished by obtaining an MCC, an MNC and a GID in SIM card information of the terminal, and operator configuration information corresponding to the terminal can be automatically obtained and loaded from a preset configuration library of the terminal according to the obtained MCC, MNC, and GID, which thereby adapts one terminal to various types of operators and improves subscriber experience.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
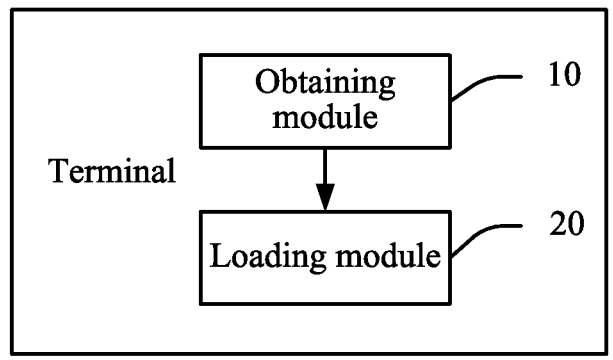
FIG. 1 is a schematic structural diagram of a first embodiment of a terminal according to the present invention.

FIG. 1 is a schematic structural diagram of a first embodiment of a terminal according to the present invention. As shown in FIG. 1, the terminal includes an obtaining module 10 and a loading module 20.

The obtaining module 10 is configured to obtain network identification information of a terminal, and obtain secondary network identification information of the terminal when it is determined, according to the network identification information, that the terminal corresponds to at least two groups of operator configuration information. The network identification information includes a mobile country code MCC and a mobile network code MNC, and the secondary network identification information includes a group identifier GID.

Specifically, the terminal may be a communications device, such as a mobile phone, a PC (personal computer), or a data card (also referred to as a USB Modem, namely, a wireless network card). In this embodiment, a mobile phone is used as an example for description.

The operator configuration information is set according to different parameter requirements of different operators. One operator may correspond to one group of configuration information, which includes at least one configuration parameter, for example, a dialing parameter or a network parameter.

The obtaining module 10 obtains network identification information of the mobile phone, where the network identification information includes an MCC and an MNC. The MCC is used to uniquely identify a country to which the mobile phone belongs and is formed by three decimal numbers (coding range: 000-999), for example, the MCC of China is 460. The MNC is used to identify a mobile network to which the mobile phone belongs and is formed by two decimal numbers (coding range: 00-99), for example, the MNC of China Mobile is 00, and the MNC of China Unicom is 01. A combination of an MCC and an MNC may distinguish different conventional MNOs.

When it is determined, according to the network identification information, that the mobile phone corresponds to at least two groups of operator configuration information, which operator the mobile phone specifically corresponds to cannot be distinguished only according to the MCC and the MNC because one operator corresponds to one group of configuration information. In this case, the obtaining module 10 needs to continue to obtain secondary network identification information of the mobile phone, where the secondary network identification information includes a group identifier GID (Group Identifier). The GID is used to uniquely identify an operator corresponding to the mobile phone. After the obtaining module 10 obtains the GID of the mobile phone, the operator corresponding to the mobile phone can be determined. As a result, different MVNOs may be distinguished, or an MVNO and an MNO may be distinguished.

The loading module 20 is configured, according to the secondary network identification information obtained by the obtaining module 10, to obtain and load operator configuration information corresponding to the terminal.

Specifically, according to the secondary network identification information obtained by the obtaining module 10, the loading module 20 can determine which operator the mobile phone specifically corresponds to, accurately obtain operator configuration information corresponding to the mobile phone, and load configuration parameters in the operator configuration information such as a dialing parameter and a network parameter.

In the embodiment of the present invention, whether a terminal corresponds to an MVNO or an MNO as well as different MVNOs can be distinguished by obtaining network identification information and secondary network identification information of a terminal, and operator configuration information corresponding to the terminal can be automatically obtained and loaded from a preset configuration library of the terminal according to the obtained network identification information and secondary network identification information, which thereby adapts one terminal to various types of operators and improves subscriber experience.

Figure 2:
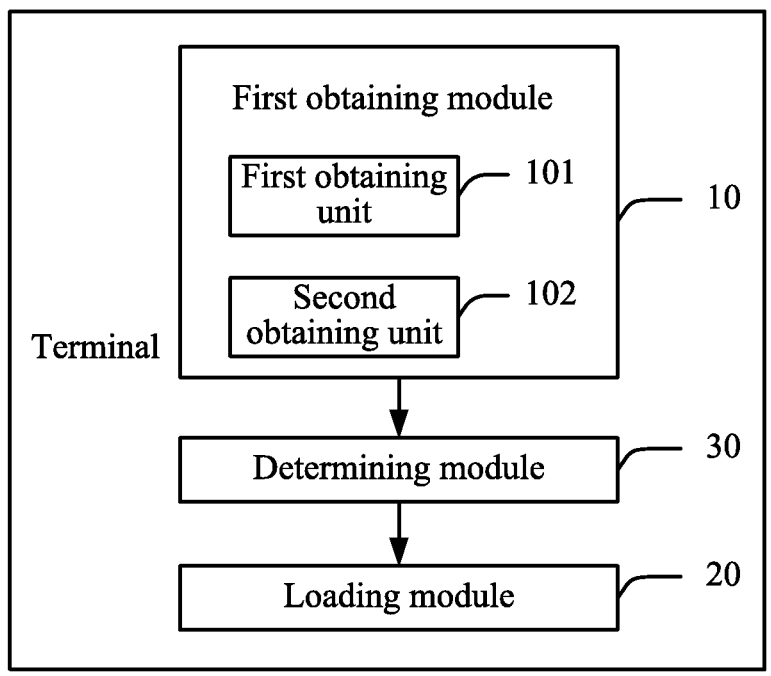
FIG. 2 is a schematic structural diagram of a second embodiment of a terminal according to the present invention.

FIG. 2 is a schematic structural diagram of a second embodiment of a terminal according to the present invention. As shown in FIG. 2, the terminal includes the obtaining module 10 and the loading module 20, which are provided in the first embodiment of the foregoing terminal. In this embodiment, the terminal further includes: a determining module 30.

The obtaining module 10 specifically includes a first obtaining unit 101, which is configured to read SIM card information of the terminal, and obtain network identification information including an MCC and an MNC.

Specifically, the first obtaining unit 101 first reads SIM (Subscriber Identity Module, subscriber identity module)

card information of the mobile phone, and then obtains the network identification information including an MCC and an MNC.

The obtaining module 10 specifically further includes a second obtaining unit 102, which is configured to obtain a group identifier GID in the SIM card information of the terminal.

Specifically, the second obtaining unit 102 obtains the GID from the SIM card information of the mobile phone.

The determining module 30 is configured to query a preset configuration library to determine the number of groups of operator configuration information corresponding to the MCC and the MNC obtained by the first obtaining unit 101.

Specifically, the mobile phone may store in advance configuration information of various types of existing operators (including various MNOs and various MVNOs), so as to form a configuration library or a configuration file, so that the mobile phone adapts to the existing operators. Definitely, when a new MNO or MVNO emerges as operators' services develop, a service of the new MNO or MVNO can be supported as long as corresponding operator configuration information is added in the configuration library of the mobile phone, without a need to replace the mobile phone. As a result, a personalized operation scheme is implemented.

It should be noted that there is a case where an MVNO and an MNO use a same network or a plurality of MVNOs share a same network. Because one network corresponds to one MCC and MNC, and one operator corresponds to one group of configuration information, there is a case where one MCC and MNC correspond to at least two groups of operator configuration information in the preset configuration library or configuration file.

The determining module 30 queries the preset configuration library according to the MCC and the MNC obtained by the first obtaining unit 101 to determine the number of groups of operator configuration information corresponding to the MCC and the MNC.

The loading module 20 is further configured to: when the determining module 30 determines that the terminal corresponds to one group of operator configuration information, load the only group of operator configuration information.

Specifically, when the determining module 30 determines that the mobile phone corresponds to one group of operator configuration information, it indicates that an operator corresponding to the mobile phone is a conventional MNO, and an MVNO that shares a network with the conventional MNO does not exist. Therefore, the loading module 20 directly loads the only group of operator configuration information, and adapts the mobile phone to correct operator configuration information.

The loading module 20 is further configured to: when the determining module 30 determines that the terminal corresponds to zero groups of operator configuration information, obtain and load default configuration information.

Specifically, when the determining module 30 determines that the mobile phone corresponds to zero groups of operator configuration information, it indicates that the determining module 30 fails to find, in a search of the configuration library of the mobile phone, the operator configuration information corresponding to the MCC and the MNC obtained by the first obtaining unit 101. Then the loading module 20 obtains and loads the default configuration information of the mobile phone. This case occurs possibly because an operator corresponding to the mobile phone is not an existing operator, and the configuration information of the operator is not stored in advance in the configuration library of the mobile phone.

In the embodiment of the present invention, whether a terminal corresponds to an MVNO or an MNO as well as different MVNOs can be distinguished by obtaining an MCC, an MNC and a GID in SIM card information of a terminal, and operator configuration information corresponding to the terminal can be automatically obtained and loaded from a preset configuration library of the terminal according to the obtained MCC, MNC, and GID, which thereby adapts one terminal to various types of operators and improves subscriber experience.

Figure 3:
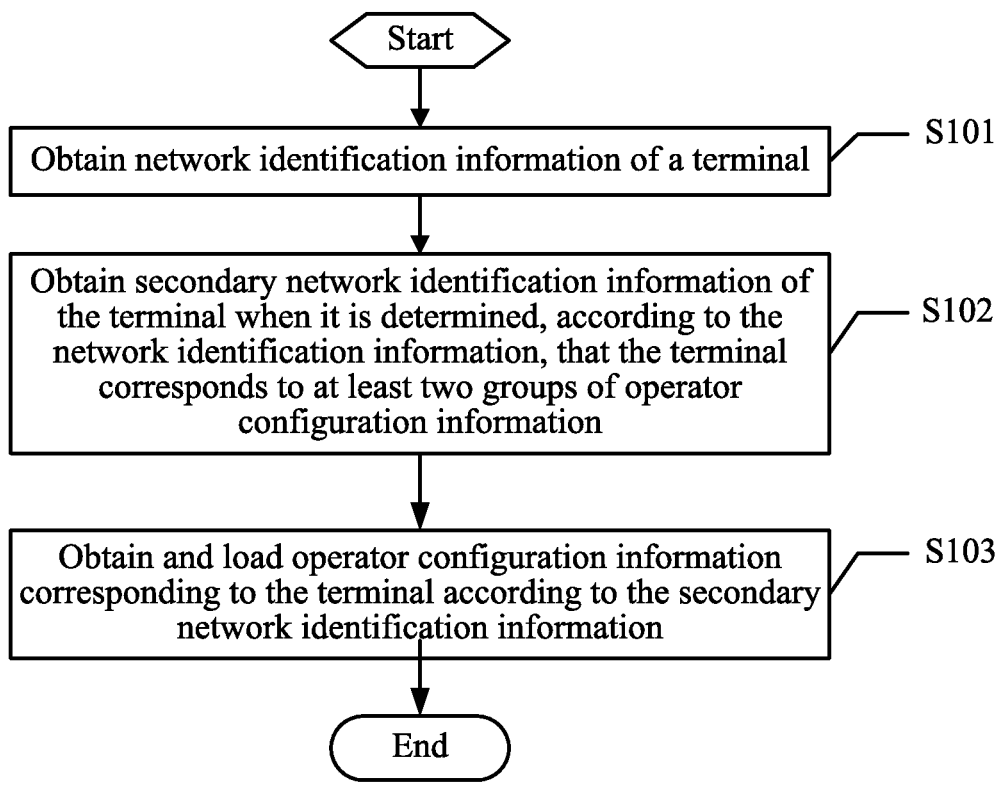
FIG. 3 is a flowchart of a first embodiment of a method for loading operator configuration information according to the present invention.

FIG. 3 is a flowchart of a first embodiment of a method for loading operator configuration information according to the present invention. The method includes the following steps.

S101: Obtain network identification information of a terminal.

Specifically, the terminal may be a communications device such as a mobile phone, a PC, or a data card. In this embodiment, a mobile phone is used as an example for description.

The operator configuration information is set according to different parameter requirements of different operators. One operator corresponds to one group of configuration information, which includes at least one configuration parameter, for example, a dialing parameter or a network parameter.

In the S101 of obtaining network identification information of a mobile phone, the network identification information includes an MCC and an MNC. The MCC is used to uniquely identify a country to which the mobile phone belongs and is formed by three decimal numbers (coding range: 000-999), for example, the MCC of China is 460. The MNC is used to identify a mobile network to which the mobile phone belongs and is formed by two decimal numbers (coding range: 00-99), for example, the MNC of China Mobile is 00, and the MNC of China Unicom is 01. A combination of an MCC and an MNC may distinguish different conventional MNOs.

S102: Obtain secondary network identification information of the terminal when it is determined that the terminal corresponds to at least two groups of operator configuration information according to the network identification information.

Specifically, when it is determined, according to the network identification information obtained in S101, that the mobile phone corresponds to at least two groups of operator configuration information, which operator the mobile phone specifically corresponds to cannot be distinguished only according to the MCC and the MNC because one operator corresponds to one group of configuration information. In this case, S102 needs to be performed to continue to obtain secondary network identification information of the mobile phone, where the secondary network identification information includes a group identifier GID. The GID is used to uniquely identify an operator corresponding to the mobile phone. After the GID of the mobile phone is obtained in S102, an operator corresponding to the mobile phone can be determined. As a result, different MVNOs may be distinguished, or an MVNO and an MNO may be distinguished.

S103: Obtain and load operator configuration information corresponding to the terminal according to the secondary network identification information.

Specifically, according to the secondary network identification information obtained in S102, which operator the mobile phone specifically corresponds to can be determined in S103, operator configuration information corresponding to the mobile phone is accurately obtained, and configuration parameters therein such as a dialing parameter and a network parameter are loaded.

In the embodiment of the present invention, whether a terminal corresponds to an MVNO or an MNO as well as different MVNOs can be distinguished by obtaining network identification information and secondary network identification information of the terminal, and operator configuration information corresponding to the terminal can be automatically obtained and loaded from a preset configuration library of the terminal according to the obtained network identification information and secondary network identification information, which thereby adapts one terminal to various types of operators and improves subscriber experience.

Figure 4:
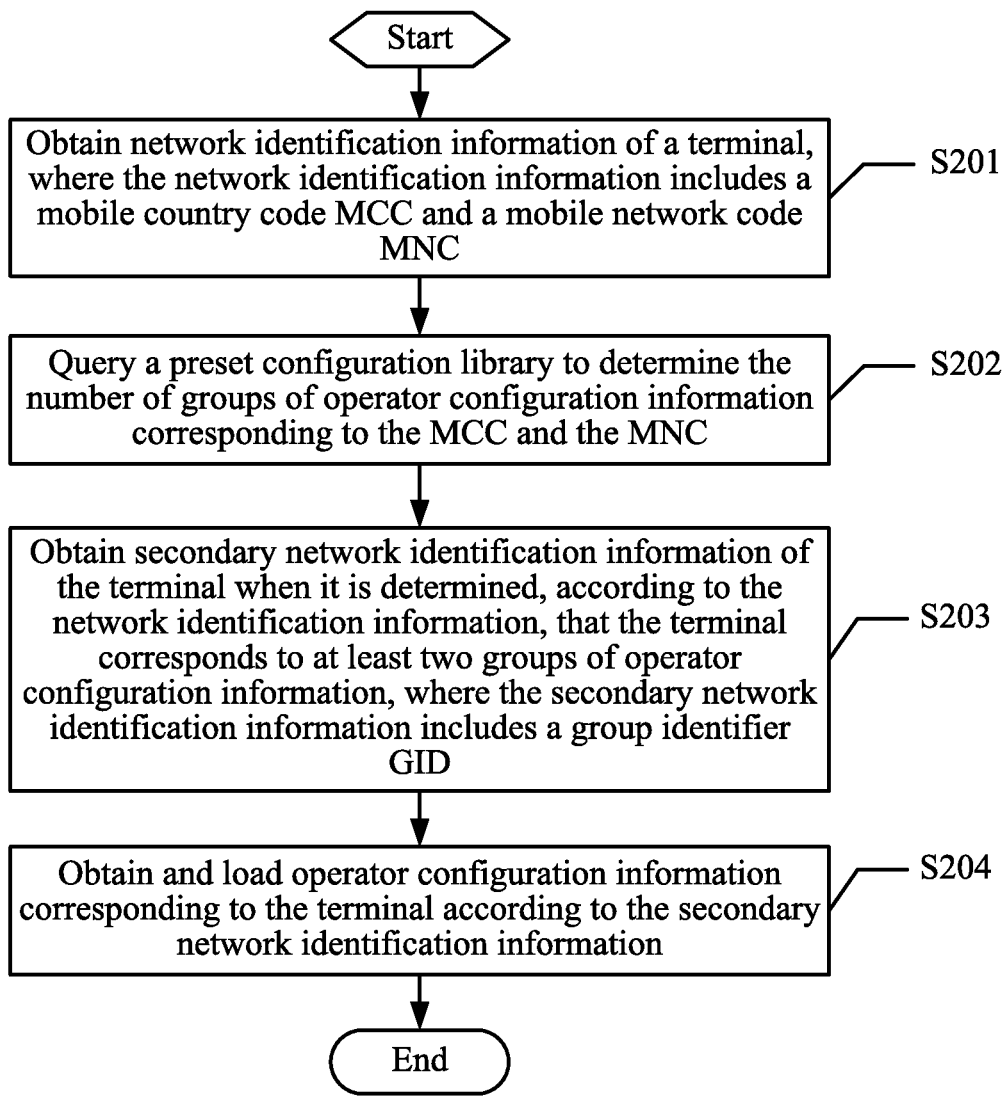
FIG. 4 is a flowchart of a second embodiment of a method for loading operator configuration information according to the present invention.

FIG. 4 is a flowchart of a second embodiment of a method for loading operator configuration information according to the present invention. The method includes the following steps.

S201: Obtain network identification information of a terminal, where the network identification information includes a mobile country code MCC and a mobile network code MNC.

S202: Query a preset configuration library to determine the number of groups of operator configuration information corresponding to the MCC and the MNC.

Optionally, when it is determined that the terminal corresponds to one group of operator configuration information, the unique group of operator configuration information may be loaded.

Optionally, when it is determined that the terminal corresponds to zero groups of operator configuration information, default configuration information may be obtained and loaded.

S203: Obtain secondary network identification information of the terminal when it is determined, according to the network identification information, that the terminal corresponds to at least two groups of operator configuration information, where the secondary network identification information includes a group identifier GID.

S204: Obtain and load the operator configuration information corresponding to the terminal according to the secondary network identification information.

In the embodiment of the present invention, whether a terminal corresponds to an MVNO or an MNO as well as different MVNOs can be distinguished by obtaining an MCC, an MNC and a GID in SIM card information of a terminal, and operator configuration information corresponding to the terminal can be automatically obtained and loaded from a preset configuration library of the terminal according to the obtained MCC, MNC, and GID, which thereby adapts one terminal to various types of operators and improves subscriber experience.

The foregoing only provides exemplary embodiments of the technical solutions of the present invention rather than to limit the protection scope of the present invention. A person of ordinary skill in the art can understand all or a part of processes for implementing the embodiments. Any equivalent variations made according to the claims of the present invention should fall within the scope of the present invention.

What is claimed is:

1. A method for loading operator configuration information, the method comprising:
    obtaining network identification information of a terminal by the terminal, wherein the network identification information comprises a mobile country code (MCC) and a mobile network code (MNC);
    obtaining secondary network identification information of the terminal by the terminal and in response to determining, according to the network identification information, that the terminal corresponds to at least two groups of groups of operator configuration information, wherein the secondary network identification information comprises a group identifier (GID);
    obtaining and loading, by the terminal, a group of the operator configuration information corresponding to the terminal according to the secondary network identification information and in response to determining that the terminal corresponds to at least two groups of the groups of operator configuration information;
    obtaining and loading, by the terminal, default configuration information in response to determining that the terminal corresponds to zero of the groups of operator configuration information; and
    communicating with a network according to loaded configuration information.

2. The method according to claim 1, wherein obtaining the network identification information of the terminal comprises reading SIM card information of the terminal, and obtaining the network identification information comprising the MCC and the MNC.

3. The method according to claim 2, wherein obtaining the secondary network identification information of the terminal comprises obtaining a group identifier (GID) in the SIM card information of the terminal.

4. The method according to claim 3, wherein before obtaining the secondary network identification information of the terminal, the method further comprises querying a preset configuration library to determine a number of the groups of operator configuration information corresponding to the MCC and the MNC.

5. The method according to claim 4, further comprising loading the group of operator configuration information only when it is determined that the terminal corresponds to one group of operator configuration information.

6. The method according to claim 1, wherein before obtaining the secondary network identification information of the terminal, the method further comprises querying a preset configuration library to determine a number of the groups of operator configuration information corresponding to the MCC and the MNC.

7. The method according to claim 1, further comprising loading the group of operator configuration information only when it is determined that the terminal corresponds to one group of operator configuration information.

8. The method according to claim 1, further comprising obtaining and loading default configuration information when it is determined that the terminal corresponds to zero groups of operator configuration information.

9. A terminal, comprising a computer including a non-transitory computer-readable medium storing program modules executable by the computer, the modules including:
    an obtaining module configured to obtain network identification information of the terminal and to obtain secondary network identification information of the terminal, in response to determining, according to the network identification information, that the terminal corresponds to at least two groups of groups of operator configuration information, wherein the network identification information comprises a mobile country code (MCC) and a mobile network code (MNC) and wherein the secondary network identification information comprises a group identifier (GID); and
    a loading module configured to obtain and load a group of the operator configuration information corresponding to the terminal according to the secondary network identification information and in response to determining that the terminal corresponds to at least two groups of the groups of operator configuration information;

wherein the loading module is further configured to obtain and load default configuration information in response to determining that the terminal corresponds to zero of the groups of operator configuration information.

10. The terminal according to claim 9, wherein the obtaining module comprises a first obtaining unit, configured to read SIM card information of the terminal and to obtain the network identification information comprising the MCC and the MNC.

11. The terminal according to claim 10, wherein the obtaining module further comprises a second obtaining unit, configured to obtain the GID in the SIM card information of the terminal.

12. The terminal according to claim 11, further comprising a determining module, configured to query a preset configuration library to determine a number of the groups of operator configuration information corresponding to the MCC and the MNC.

13. The terminal according to claim 12, wherein the loading module is further configured to load the group of operator configuration information when it is determined that the terminal corresponds to one group of operator configuration information.

14. A terminal, comprising:
a processor; and
a non-transitory computer readable medium connected to the processor and having stored thereon instructions that, when executed by the processor, cause the terminal to:
  obtain network identification information of the terminal and to obtain secondary network identification information of the terminal, in response to determining, according to the network identification information, that the terminal corresponds to at least two groups of groups of operator configuration information, wherein the network identification information comprises a mobile country code (MCC) and a mobile network code (MNC) and wherein the secondary network identification information comprises a group identifier (GID);
  obtain and load a group of the operator configuration information corresponding to the terminal according to the secondary network identification information and in response to determining that the terminal corresponds to at least two groups of the groups of operator configuration information; and
  obtain and load default configuration information in response to determining that the terminal corresponds to zero of the groups of operator configuration information.

15. The terminal according to claim 14, wherein the instructions causing the terminal to obtain network identification information further comprise instructions causing the terminal to read SIM card information of the terminal and to obtain the network identification information comprising the MCC and the MNC.

16. The terminal according to claim 15, wherein the instructions causing the terminal to obtain network identification information further comprise instructions causing the terminal to obtain the GID in the SIM card information of the terminal.

17. The terminal according to claim 16, wherein the non-transitory computer readable medium further has stored thereon instructions that, when executed by the processor, cause the terminal to query a preset configuration library to determine a number of the groups of operator configuration information corresponding to the MCC and the MNC.

18. The terminal according to claim 17, wherein the instructions causing the terminal to obtain and load a group of the operator configuration information further comprise instructions causing the terminal to load the group of operator configuration information in response to determining that the terminal corresponds to only one group of operator configuration information.

* * * * *